Oct. 31, 1950     E. J. M. HUBERT     2,528,146
CHUCK
Filed Dec. 15, 1948     2 Sheets-Sheet 1
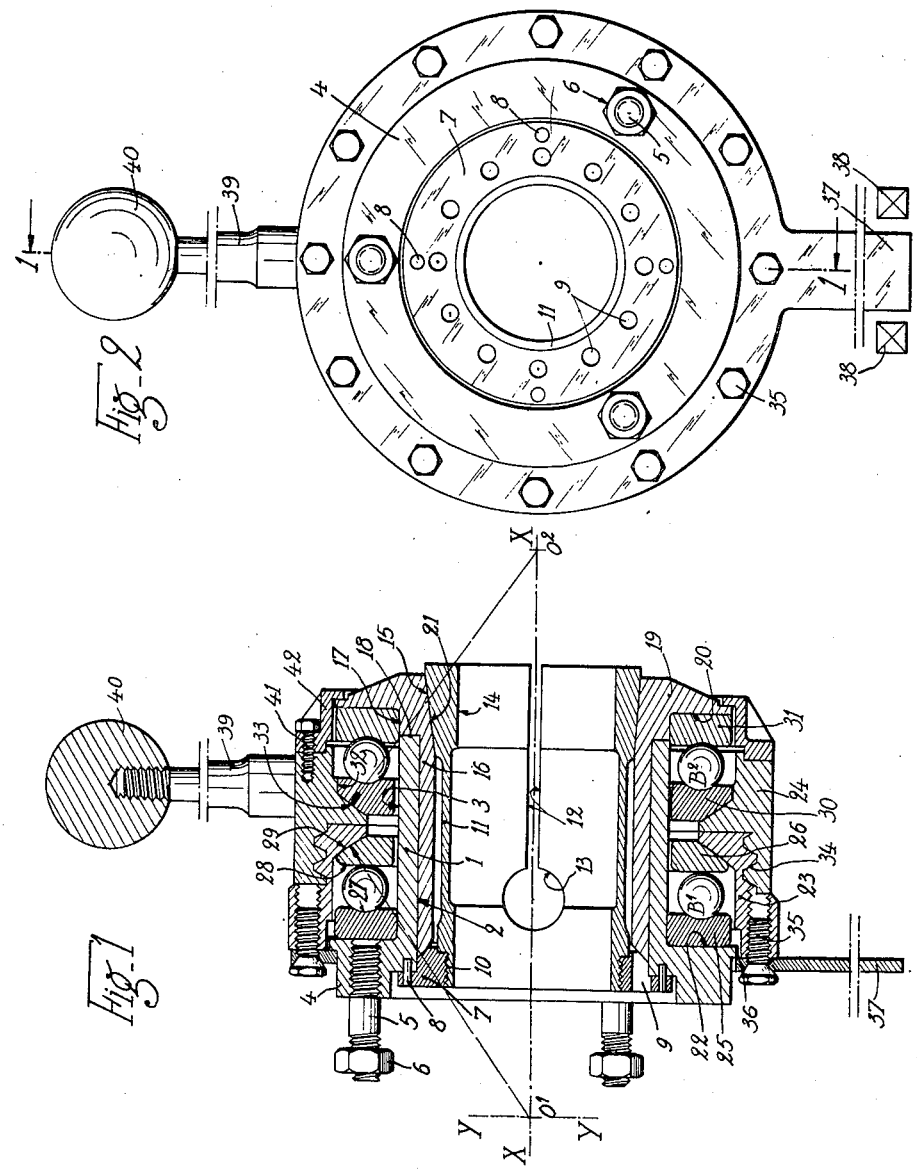
Inventor
Emile Jean Maurice Hubert
By Robert E. Burns
Attorney Oct. 31, 1950     E. J. M. HUBERT     2,528,146
CHUCK Filed Dec. 15, 1948     2 Sheets-Sheet 2

Inventor
Emile Jean Maurice Hubert
By Robert E. Burns
Attorney

Patented Oct. 31, 1950

2,528,146

UNITED STATES PATENT OFFICE 2,528,146

CHUCK

Emile Jean Maurice Hubert, Le Raincy, France, assignor of one-half to Ateliers de Constructions de La Seine, Paris, France, a French company Application December 15, 1948, Serial No. 65,309
In France December 22, 1947

6 Claims. (Cl. 279—51)

The present invention relates to chucks for machine-tools, such as lathes and screw-cutting machines, said chucks being intended for imparting a rotary motion to the bar or other work-piece to be machined.

It has already been proposed to construct chucks which comprise a resilient slotted clamping grip fixed to a rotary support which is locked against longitudinal movement, the closing of said clamping grip which is adapted to hold the work-piece, being effected by the longitudinal movement on said grip of a slider provided with a frusto-conical bearing surface adapted to co-operate with a conjugated surface of the grip; said slider is moved longitudinally with respect to said support by means of a relative longitudinal movement imparted to two crowns which are concentric with the axis of the chuck and which are adapted to bear against shoulders of the support and of the slider by means of two anti-friction thrust bearings, said crowns being in mutual contact by means of surfaces (helical threads or ramps) such that their relative longitudinal movement is obtained by imparting to them a relative rotary movement about the axis of the chuck.

Experience has shown that such chucks generally operate very badly or even completely fail to operate as soon as the tightening forces become great. This is due to the practical impossibility, under the present conditions of machining, of obtaining a perfect centring between the two aforesaid crowns owing to the fact that, under the known conditions of machining, their helical contact surfaces cannot be made with the necessary accuracy.

The present invention has for its object to provide a chuck of the foregoing type which is improved so as not to have the above mentioned drawbacks, that is to say is capable of operating in a practically perfect manner even at very high speeds of rotation and however heavy the axial pressures on the thrust bearings may be.

The invention has further for its object a chuck in which at least one of the rolling surfaces of one of the rings of one of the thrust bearings in plane, without a groove, whereas one of said thrust bearings is swivel-mounted in the conjugated actuating crown.

By means of this arrangement the two actuating crowns can move relatively to one another either with a radial translatory movement, i. e. at right angles to their common axis, or with an oscillatory movement about a transverse axis that may pass or not through said longitudinal axis. Any jamming is thus prevented.

Other features will become apparent from the ensuing description.

In the accompanying drawing which is given solely by way of example:

Fig. 1 is a longitudinal section along a diametrical plane of a first embodiment of a chuck according to the invention;

Fig. 2 is an end view of said chuck, on the side on which it is adapted to be fixed to the arbor of the machine-tool;

Figure 3:
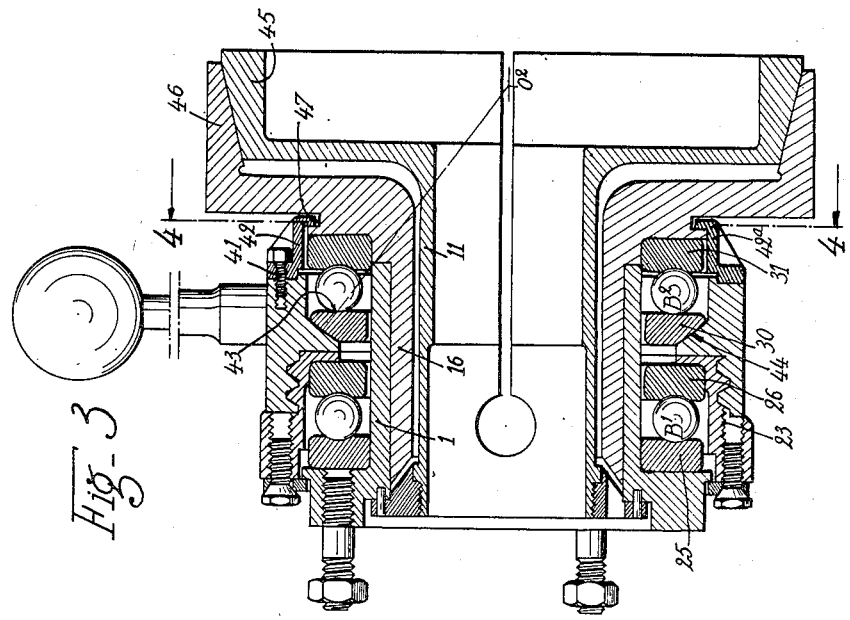
Fig. 3 is a longitudinal section of a modification with a bell-shaped clamping grip.

According to the embodiment shown in Figs. 1 and 2, the chuck comprises a hollow cylindrical support 1, the axis of which is XX and both the internal surface 2 and the external surface 3 of which are trued by grinding. This member is provided with a flange 4 adapted to be fixed to the arbor of a machine-tool (lathe, screw-cutting machine or the like), for example by means of a number of studs 5 provided with nuts 6. On the rear face of said support 1 a ring 7 is fitted in the bore 2, said ring being prevented from rotating relatively to the support 1 by a number of projections 8. Said ring 7 is provided, towards the centre relatively to its bearing surfaces in the bore 2, with a number of holes 9 which extend right through it and are preferably uniformly distributed over its periphery (see Fig. 2). Said ring 7 is tapped at 10 in order to enable a clamping grip 11 to be fixed thereon by screwing it right home. Said clamping grip is formed by a cylindrical drum which is provided with radial slits 12 which extend from its front end (right-hand end in Fig. 1) over a certain length thereof and terminate in a circular portion 13 so as to form resilient segments. Said segments, which have a cylindrical inner face 14 for clamping the bar or other work-piece to be clamped so that it can be rotated on the axis XX, are provided externally with a frusto-conical surface 15, the axis of which is XX and the angle of which at the apex is preferably about 10 to 15° whereas the angle of the usual clamping grips is greater than 26°.

Round the clamping grip is located a slide 16 of revolution about the axis XX. Said slider is centred in the bore 2 of the support 1 relatively to which it can slide longitudinally. It is provided on the outside with a cylindrical bearing surface 17 in alignment with the outer cylindrical surface 3 of the support 1. The shoulder 18 between the two cylindrical surfaces of said slider limits its movement towards the left (Fig. 1) by abutting against the front end of the support 1. In front of the cylindrical bearing surface 17, the slider 16 is provided with a flange 19, the surface 20 of which is at right angles to the axis XX. Internally, the slider 16 is provided at the front with a frusto-conical surface 21 which has the same angle at the apex as the frusto-conical surface 15 of the clamping grip 11 against which it is adapted to bear.

Between the trued bearing surfaces 22 and 20 of the flange 4 of the support 1 and of the flange 19 of the slider 16 is mounted an axial pile formed of two ball (or roller) thrust bearings $B^1$ and $B^2$ and of bearing flanges of two crowns 23 and 24. The thrust bearing $B^1$ comprises two bearing rings 25 and 26 on which the balls or rollers arranged between them are adapted to roll. The ring 25 is provided in the usual manner with a groove 27 for said balls, whereas on the contrary the rolling face 28 of the other ring 26 is smooth and is located in a plane at right angles to the longitudinal axis XX.

Finally, the outer face 29 of the ring 26, which is in contact with the crown 23, and the corresponding face of said crown are spherical so as to form a swivel joint, the common centre of the two contacting surfaces being located at $0^1$ on the longitudinal axis XX.

As regards the other thrust bearing $B^2$, the two rings 30 and 31 are provided with usual grooves. Furthermore, the ring 30 is centred by means of a cylindrical bearing surface 32 in the crown 24.

The side face 33 of said ring and the corresponding face of the crown may advantageously be spherical with their centre at $0^2$, the radius being the same as that of the face 29 of the ring 26 of the other anti-friction bearing, although said face 33 and the conjugated face of the crown 24 may be flat and at right angles to the axis XX if desired.

The crowns 23 and 24 are screwed into one another by means of a helical thread 34, so that a relative rotation of the two crowns with respect to one another produces a relative longitudinal movement of said crowns either towards one another, or away from one another.

On the rear face of the crown 23 is fixed by means of screws 35 or otherwise a ring 36 provided with a projecting portion 37 which may either form an actuating handle, or be engaged between two stationary bosses 38 (Fig. 2) that form a fork on the frame of the machine-tool so as to lock the crown 23 against rotation.

As regards the other crown 24, the same is provided with an actuating lever 39 terminating in a handle 40. Furthermore, on the front face of said crown is fixed, by means of screws 41 or otherwise, a ring 42 of right angle Z-shaped cross-section which is adapted to fit over the flange 19 of the slider 16 from the front towards the rear. The distance between the rear face of said ring 42 and the front face of the ring 31 of the bearing $B^2$ is slightly greater than the corresponding thickness of the flange 19 of the slider.

The chuck operates as follows. When the two crowns 23 and 24 are screwed right home into one another as illustrated, the slider 16 is retracted by the ring 42, which is secured to the crown 24, to its position as far to the left as possible relatively to the longitudinally stationary support 1. The clamping grip 11 is then opened by resilience to the utmost extent. If the machine-tool is operating, said clamping grip 11 rotates about the axis XX, being carried along by the ring 7 and the support 1 which is in turn fixed to the rotary arbor of the machine. If it is then desired to fix a piece to be machined in the clamping grip 11, without stopping the machine (or at any rate the arbor), said piece is inserted in the grip, then by means of the handle 40 the crown 24 is rotated relatively to the crown 23 in the direction which causes them to move axially apart. This causes the two thrust bearings $B^1$ and $B^2$ to move apart. Since the bearing $B^1$ is fixed, the bearing $B^2$ moves forwards i. e. towards the right in Fig. 1, and carries with it the slider 16. The cone 21 then presses against the cone 15 of the clamping grip 11 and closes the same over the work-piece to which a rotary movement is thus imparted at the same time moreover as to the slider 16 owing to the fact that the same is pressed against the clamping grip. The rotation of said slider is made possible by the anti-friction bearing which is interposed between it and the set of crowns 23, 24. As the thrust bearing $B^2$ bears against the flange 19, there is a slight clearance between said flange and the ring 42 so that there is no friction (therefore no wear) between said flange and said ring.

Owing to the projecting portion 37 engaged between the abutments 38, the crowns 23—24 are not driven and remain stationary. Experience shows moreover that even without the locking of the crown 23 by means of the projecting portion 37 the two crowns as a whole behave like a suspended pendular mass which merely assumes an angular position of equilibrium by the action of two opposite couples which are acting on it and one of which is due to the eccentric weights of the lever 39 and of the projecting portion 37 which for said position of equilibrium are obviously not vertical, and the other of which is due to the slight driving friction transmitted by the anti-friction bearings.

When it is desired to remove the work-piece, it is only necessary to rotate the crown 24 in the opposite direction relatively to the crown 23, so that the first crown moves towards the left; the thrust bearing $B^2$ thus retracts in front of the flange 19, but owing to the particularly slight taper of the surfaces 15 and 21, the clamping grip 11 by opening, and contrary to what takes place in the usual chucks, would be incapable of moving the slider 16 towards the rear (towards the left). This function is allotted to the ring 42 which is secured to the crown 24 and which, after the clearance hereinbefore mentioned has been taken up, returns the slide 16 towards the left and allows the clamping grip 11 to open.

As will be realized, the operation which has just been explained is the same, save for the retraction of the slider 16, at any rate as the theoretical operation of the usual chucks of the same type, but which neither have the spherical face 29 on one of the thrust bearings, nor the plane surface 28 of said thrust bearing. "Theoretical operation" has just been mentioned, since on point of fact, as stated at the beginning of the present specification, the usual chucks of this type have been found to be practically useless and all the tests that have been carried out in this respect have proved to be failures. This can be readily understood. In order to clamp the work-piece, the pressure exerted on the thrust bearings has to be considerable and is greater as the angles at the apex of the conical surfaces of the clamping grip and of the slider are greater. Under these conditions, the thrust bearings, in order to be able to operate, must remain absolutely coaxial with the axis XX so that all the balls (or rollers) bear simultaneously. Now, if said bearings are respectively centred by means of the usual rings of usual rectangular cross-section in the crowns 23 and 24 and if all the rings are provided with grooves, said bearings are literally confined by said crowns. The accurate centring could therefore only be obtained by as accurate a centring of the crowns, which is impossible since, if it is assumed that one of them is centred, the other which has play relatively to the first crown owing to the machining tolerances of the shifting thread 34 (or cams) cannot be accurately centred.

The solution according to the invention, on the contrary, solves this problem, since as the ring 31 of the thrust bearing B² is perfectly centred on the bearing surface 17 of the slider 16, which is in turn centred in the bore 2 of the support 1, the ring 30 is centred by the two grooves and the balls of the bearing B², and said ring in turn centres the crown 24 by means of the cylindrical bearing surface 32. This being assumed, the crown 23 which is slightly floating relatively to the crown 24 owing to the machining tolerances of the thread 34, is not liable to produce jamming since it remains free to effect two series of movements; on the one hand it can oscillate of its own accord in all directions about the centre $O^1$ of the concentric spherical surface of the ring 26 of the bearing B¹ and on the other hand it can effect a radial translatory movement with the ring 26 owing to the plane face 28, without a groove, of said ring 26.

In short, said crown 23 can therefore oscillate about a centre which may occupy in a plane YY at right angles to the axis XX and passing through the centre $O^1$, any position inside a small circle, the diameter of which corresponds to the radial play of the crown 23 with respect to the crown 24, said play being due to the necessary manufacturing tolerances of the thread 34.

It should be noted that the spherical surface 33 of the ring 30 of the bearing B² and the conjugated surface of the crown 24 do not perform any function as regards the behaviour of the mechanism. Such spherical surfaces should only be chosen, in preference to the usual plant shape, for convenience of supply. It will be observed that the special ring 26 of the thrust bearing B¹ can be obtained from an identical ring to the ring 30 of the thrust bearing B² by merely machining the face in which the groove is provided until said groove is removed.

In addition to the fundamental advantage hereinbefore analysed, the chuck described has other advantages.

The very small angle at the apex of the cones 15 and 21 of the clamping 11 and of the slider 16 enable the compression force on the anti-friction bearings to be decreased, but said angle would, as already stated, be insufficient to produce the retraction of the slider when loosening the chuck; said retraction is positively effected by the ring 42.

The thrust ring B² has been shown as centred on the bearing surface 17 of the slider 16, although it could conceivably be centred as in the known devices on the outer surface 3 of the support 1, but the first solution makes it possible to reinforce the slider at the base of its flange, whereas said slider would be comparatively fragile in that region if the support 1 were extended below the ring 31 of the bearing B².

Finally, the holes 9 provided in the ring 7 which connects the support 1 to the clip 11 enable the removal to be effected towards the rear of the small turnings which have penetrated through the slits 12 and the holes 13 of the clamping grip 11 into the space between said grip and the slider and which have passed between said ring 7 and the rear edge of the slider when same is in its forward position, which is precisely the machining position.

Figure 4:
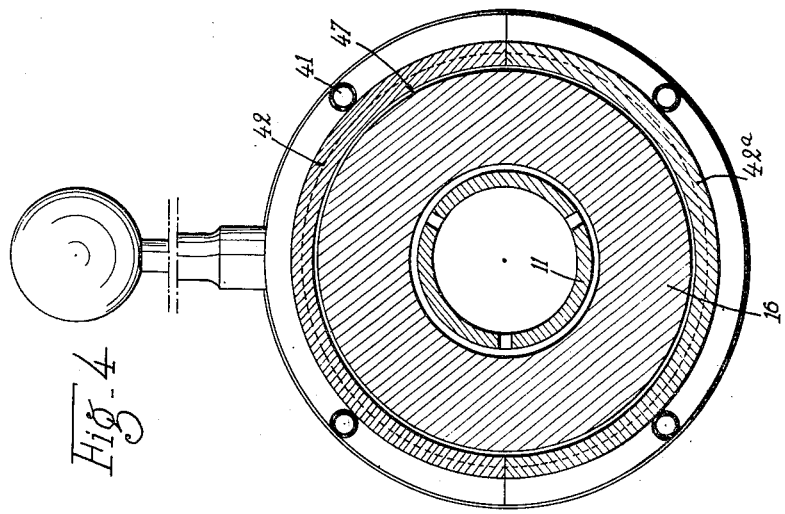
Fig. 4 is a transverse section along the line 4—4 of Fig. 3.

In Figs. 3 and 4, a modification has been shown in which the clamping grip 11 of the known bell-shaped type. By way of a modification, it has been assumed that the ring 26 of the bearing B¹ is of the usual conventional type in which case the crown 23 is centred on the support 1 by means of said bearing B¹ and the ring 30 of the bearing B² is provided with a face 43 without a groove and a spherical external surface 44 of centre $O^2$, the cylindrical bearing surface 32 of the crown 24 of the first example being eliminated. In this case it is therefore said crown 24 which is floating.

Because of the bell 45 of the clamping grip, 11, the slider 16 itself is bell-shaped at 46 and, because of mounting requirements, the retracting ring has to be in two diametrically opposite portions 42 and 42a. There two portions are engaged in a groove 47 of the slider.

The device operates in the same manner as in the first example; it also has the same advantages.

Naturally, the invention is in no way limited to the embodiments illustrated and described which have only been chosen by way of example.

The plane rolling surface and the spherical surface could at will be provided respectively on each thrust bearing.

As hereinbefore stated, the connection by means of helical threads between the two crowns 23 and 24 could be replaced by a set of helical cams.

Having now described my invention what I claim as new and desire to secure by Letters Patent is:

1. A chuck for a machine-tool, which comprises a cylindrical support provided with an external flange adapted to be fixed to a rotary portion of the machine, a slider longitudinally movable in said support relatively to which it is centered, said slider being provided, on the one hand with an outer flange at the end thereof which is remote from the flange of said support, and on the other hand with a frusto-conical inner surface, a resilient slotted clamping grip coaxially mounted in said support, to which it is longitudinally fixed and in unison with which it is adapted to rotate, said clamping grip being provided with a frusto-conical outer surface in contact with said frusto-conical inner surface of said slider, both of said surfaces having substantially the same angle at the apex, two external actuating crowns adapted to surround said support between said flanges and having a connection between them which has a certain radial play and enables a relative longitudinal movement to be imparted to said crowns, and a ball thrust bearing between each of said crowns and the conjugated flange, at least one of the rolling surfaces of one of said bearings being plane, without a groove, whereas one of said bearings forms a swivel in the conjugated external crown.

2. Chuck according to claim 1 wherein the two thrust rings with which the bearings press against said crowns are of the same type with a spherical bearing surface but one of them is centred in a cylindrical housing of the corresponding crown.

3. Chuck according to claim 1 wherein the race ring of one of said thrust bearings, and which is adapted to bear against the flange of the slider, is centered on a bearing surface of said slider.

4. Chuck according to claim 1 wherein the angle at the apex of said conjugated frusto-conical surfaces of said slider and of said clamping grip is between 10 and 15°, the corresponding actuating crown being provided with an abutment which is adapted to bear against said slider in the retracting direction thereof.

5. Chuck according to claim 4 wherein said abutment is formed by a ring which is fixed on said crown and surrounds, with a certain clearance between it and the adjacent ring of the corresponding thrust bearing, the flange of the slider against which said ring of said abutment is adapted to bear.

6. Chuck according to claim 1 wherein an intermediate ring is provided for fixing the resilient clamping grip to said support, said ring being provided with holes for the outlet of the small turnings that have penetrated between the clamping grip and the slider.

EMILE JEAN MAURICE HUBERT.

REFERENCES CITED

The following references are of record in the file of this patent:

UNITED STATES PATENTS

| Number | Name | Date |
|---|---|---|
| 2,311,258 | Sjognen | Feb. 16, 1943 |
| 2,383,156 | Phillips | Aug. 21, 1945 |
| 2,397,159 | Schneider | Mar. 26, 1946 |
| 2,436,848 | Benjamin et al. | Mar. 2, 1948 |